UNITED STATES PATENT OFFICE 1,928,824

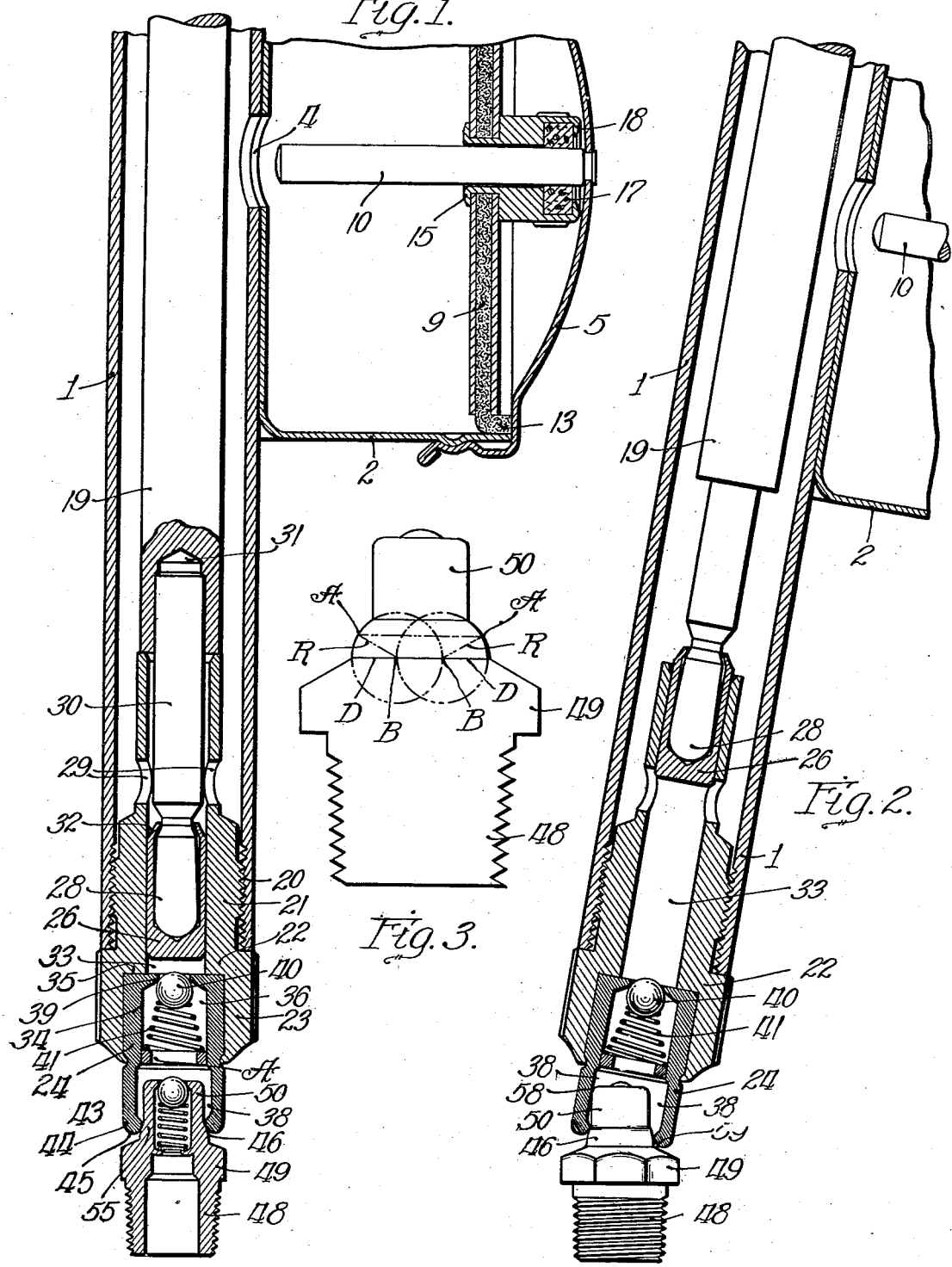

LUBRICATING APPARATUS

Oscar U. Zerk, Chicago, Ill., assignor to Alemite Corporation, Chicago, Ill., a corporation of Delaware Application December 27, 1929
Serial No. 416,825

4 Claims. (Cl. 285—161)

My invention relates to lubricating means and methods.

In lubricant gun lubrication, two types of apparatus are commonly used: First, the interlocking type employing a coupling for the purpose of temporarily interlocking the lubricant gun nozzle and the lubricant receiving nipple; and, second, the contact type where the lubricating gun nozzle and nipple are not temporarily interlocked, but simply pressed against each other and held in lubricant communicating contact by manual pressure during the lubricating period.

While, broadly considered, my invention is adaptable for use for apparatus of either one of the above named two types, I will explain and describe the adaptation thereof to the contact type.

My invention relates more specifically to a nozzle and nipple coupler construction of the contact type where the contact is made remotely from the lubricant receiving end of the nipple similar to that described in my co-pending applications for Patent, Serial No. 396,352 filed September 30, 1929, and Serial No. 397,714 filed October 5, 1929.

I have described in these cases a construction wherein the contacting surface of the nipple is not formed as a section of a spherical surface and wherefore only a relatively small angularity of relative alignment between the nozzle and nipple, without leakage, is possible. Even should the nipple contacting surface be spherically formed, leakage would occur when the nozzle is pressed against the nipple when disposed at a considerable angle to the axis of the nipple, due to the existence of parallel co-axal circular grooves which inadvertently appear in such a spherical contacting surface due to the inaccuracies effected by the tool, employed in the quantity production of these nipples.

I find that wherever leakage occurs between the engaged contact surfaces of the nozzle and nipple elements of the contact type couplers, due to structural causes which effect an increase of leakage as the angularity of relative disposition of the nozzle and nipple is increased are susceptible to decreasing the leakage by decreasing the pressure of lubricant attempted to be transmitted from the one coupler element to the other past lubricant sealing contact established between the nozzle and nipple.

For instance, in the case of leakage initiated at an angle of about 5° from alignment of the nozzle and nipple, with the fluid pressure effected in the gun of a value of about 3000 pounds per square inch, when either a spherically or parti-spherically formed contact surface is employed by the nipple, a grease gun nozzle applied to the nipple at an increased angle of about 10° from alignment therewith will not effect substantial leakage, if, at the same time, the fluid pressure is reduced to a pressure of about 1000 pounds per square inch.

Systems wherein the lubricant forced through the coupler to the bearings to be lubricated of between 500 and 1000 pounds per square inch are generally considered to be capable of effectively forcing lubricant into any of the chassis bearings of an automobile to which lubricant is directed by the coupler mechanism, except such bearings as may be so tightly packed with degenerated lubricant as to be substantially "frozen"; in any such event, such particular "frozen" bearings must have special treatment, and the present is more particularly directed to providing for the successful lubrication of bearings such as chassis bearings of an automobile which are not "frozen", and which will successfully receive lubricant under a pressure from 500 to 1000 pounds per square inch although in its broader phases, it is not to be considered limited to such use.

The present invention, therefore, involves the proposition of providing for a permissible angularity of approximately 10° between the nozzle and nipple elements of a contact type coupler, under conditions whereby the lubricant supplied to the feeding element of the coupler shall not be under a pressure greatly exceeding 1000 pounds per square inch during lubricant dispensing operation.

I seek to provide lubricant coupler mechanism and dispensing mechanism associated therewith, whereby such an angularity may be provided without the necessity of providing for the nozzle an element forming the nozzle per se which is oscillatable with respect to the supporting portion of the nozzle mechanism as set forth in my said co-pending application, and which involves a more expensive construction, whereby an angularity of 30° was possible by virtue of the oscillatable character of elements of the nozzle mechanism not herein provided.

The pressure of contact exerted between the engaging lubricant sealing contact surfaces of a nozzle and nipple of the contact type is not always a function of the forwardly directed thrust exerted against the lubricant gun or other lubricant dispensing mechanism to the dispensing end of which the nozzle is affixed, since the pressure of lubricant contained between the nozzle and nipple surfaces enclosed by the contact surfaces thereof and whose pressure is a function of the manually effected pressure exerted on the gun operates to tend to separate the nozzle and the nipple and if the enclosed areas are sufficiently great actual unseating with attendant loss of lubricant under the fluid pressure developed in the lubricant by the force of the thrust will result.

Inasmuch as this reacting fluid pressure tending to effect disengagement between the nozzle and nipple contact surfaces is increased in the case of nipple and nozzle constructions of the type disclosed in my said co-pending application herein, the enclosed area of the nipple upon which the reacting fluid pressure is effective is increased over that of prior constructions wherein the lubricant sealing contact is had between the nozzle and the bounding edge of the nipple tip as in certain prior constructions which I previously evolved, but which had other attendant disadvantages. I propose in the present construction to increase the pressure of contact for a given thrust effort exerted upon the nipple by the nozzle.

This I accomplish by providing suitably formed contact surface portions for the nipples, and which are so related to the dimensional characteristics of the engaging nozzle surface that a more or less wedging contact is had between said nipple and nozzle surfaces. I find that by suitably formed surfaces achieving more or less wedging engagement, that the pressure of contact may be increased very easily to four times the value effected in the construction shown in my said co-pending application, and with still further modification of form the effective contact pressure resulting may reach a value ten times as great as in the said construction. It is quite important in effecting communication of lubricant from a nozzle to a nipple of the contact type that the area of the nozzle and nipple enclosed by the approximately circular line of contact upon which the pressure of fluid enclosed thereby is effective to tend to separate them, must always be smaller than the face of the pump piston provided in lubricant guns carrying such a nozzle and upon which the manually directed thrust is commonly effected.

An object of my invention, therefore, is to provide a nozzle and nipple construction for lubricant couplers of the contact type wherein the effective areas of the nozzle and the nipple surfaces enclosed by the line of contact between the nozzle and nipple in a construction of the type illustrated in my said co-pending application of such reduced dimensions as at least not to exceed the diameter of the piston face for the gun having such nozzle.

Another object of my invention is to provide improved means for effecting increased pressure of contact between nozzle and nipple coupler elements of the contact type for any given pressure effort tending to force said element into contact over prior constructions of similar types.

Another object of my invention is to effect a substantially wedging action between the contacting surface of nozzle and nipple elements of contact type lubricant communicating couplers.

Another object of my invention is to provide an improved construction for cooperative nozzle and nipple elements of contact type lubricant communicating couplers of the general type disclosed in my said co-pending application.

Another object of my invention is to provide an improved construction for cooperative nozzle and nipple elements of contact type lubricant communicating couplers of the general type of prior constructions previously in use.

Another object of my invention is to provide for the communication of lubricant under pressure between nozzle and nipple elements of a contact type lubricant communicating coupler under conditions of greater variation in alignment between said nozzle and nipple elements.

Another object of my invention is to provide for the achievement of any of the foregoing objects in an improved construction whereby the nozzle and nipple elements are positively stopped from achieving angular relations which are too greatly varient from alignment to achieve communication of lubricant from the one to the other element without loss of lubricant.

Another object of my invention is to provide an improved combination nozzle and pump cylinder construction in association with an element of a lubricant dispensing mechanism supporting the same whereby the parts may be less expensive to manufacture, may be assembled inexpensively and efficiently, may be operated under most favorable conditions at all times without requirement that undue care be exercised and which will not be readily susceptible to breakage during casual handling or in use.

Other objects of my invention and the invention itself will be apparent to those skilled in the art to which my invention appertains by reference to the following description of an embodiment of my invention wherein reference is had to the accompanying drawing illustrating said embodiment.

In the drawing:

Fig. 1 is a view in longitudinal medial section of a fragment of lubricant gun and piston rod therefor and a combination nozzle and piston cylinder construction for the gun in association with a nipple of the improved construction cooperatively related thereto;

Fig. 2 is a view of the same elements of structure shown in Fig. 1, but with the nozzle and nipple disposed in a relatively differently aligned position while in cooperative contact;

Fig. 3 represents a diagrammatic view of the contact surface of the nipple.

In the drawing wherein like parts are designated by like reference characters, a lubricant gun supporting tube 1 supports a shallow sheet metal cup 2 forming a lubricant container or reservoir by a transversely grooved surface 3 of the cup end wall which is preferably welded or otherwise rigidly and integrally secured thereto.

The cup and tube have aligned communicating apertures 4 for effecting a communication of lubricant from the reservoir chamber to the interior of the tube 1. The cup is provided with a cap 5 having a peripheral annular flange 6 deformed to form an interior screw-thread surface 7 adapted to be turned onto a cooperatively deformed exterior thread surface 8 of the cup side walls near its rim. A piston follower 9 of disk form is disposed co-axially in the cup and is guided in co-axial relation longitudinally of the cup toward its grooved wall 3 by an axially disposed guiding rod 10 secured by its head 11 centrally of the cap 5 whose end wall is of concavo-convex form, the rod 10 projecting centrally from its concave side, said disk being supported on a tubular holder 12.

The follower 9 is in the form of a centrally perforated disk of leather or like material having an outwardly turned tubular flange 13 which engages the lateral walls of the cup 2 to effect a good lubricant sealing contact therewith. Grease or other lubricant is placed within the cup before the follower 9 is inserted therein and then the follower 9 and cap 5 with the guiding rod 10 secured to it are successively positioned as shown with the rod 10 telescoped through the holder 12 which in turn supports the follower 9 and a pair of centrally perforated plates 14 of disk form between which the follower is clamped.

The anterior end of the tube is provided with an interior screw thread 20 and a combination nozzle support, piston cylinder and piston guide, hereinafter generally termed the dispensing element, is screw threaded by its tubular shank 21 into the anterior end of the tube in threaded engagement with the threads 20.

The dispensing element referred to herein generally by the reference character 22 comprises beside the exteriorly threaded shank 21, an enlarged nozzle holder portion 23, and a rearwardly extending piston guide 27. The shank 21 provides by its bore a cylinder 25 for a piston 26 reciprocable therein, said piston being oscillatably carried on an elongated knob 28 forming the end of the piston rod.

The rearwardly extending portion 27 of the dispensing element receives the piston projected through its tubular bore and is provided with a plurality of apertures 29 through its wall at its end adjoining the shank 21. The piston rod 19 comprises a connecting rod portion 30, which, preferably, is made of hardened steel, and which is of reduced diameter relative to the rod proper 19, and is forced tightly within a recess 31 at the anterior end of the rod and extends therefrom. When the parts are assembled for operative use, as illustrated, the end of the tubular guide 27 forms a stop for the end of the piston rod proper 19.

The piston 26 is in the form of a tubular shell closed at its anterior end to form a piston head, has long cylindrical exterior walls in close fitting engagement with the walls 25 of the cylinder bore and its posteriorly disposed rim portion 32 is bent inwardly to fit into an annular recess of the outer surface of the connecting rod 30, disposed intermediate the knob 28 and the posteriorly disposed supporting portion of the rod, to hold the piston on the rod.

The plates 14 and intermediate disk 9 are tightly clamped together by the turned over end 15 of a tubular stem or neck 16 projecting axially of said holder. The other end of the holder is provided with an annular recess into which an annular packing gasket 17 of cork or like material is placed, end portions 18 of the holder being inturned to retain the gasket in place. The rod 10 is telescoped through the bore of the holder and gasket, said gasket making lubricant sealing contact with the rod. The holder makes sliding engagement with the rod and keeps the holder in co-axial relation therewith, whereby the follower 9 is prevented from undesirable tipping, which might increase the resistance to movement of the follower 9 within the walls of the cup 2. Although, the size of the drawing sheet does not conveniently permit illustration herein of the portion of the lubricant gun comprising a closed posterior end for the tube 1 and a handle for the piston rod 19, which projects through an end of the tube, which is, however, sealed against the ingress of air or egress of lubricant around said tube, reference may be had to my co-pending application, Serial No. 410,216, filed November 27, 1929 (Case Z—46) for a more complete description of the structure preferably provided for the posterior end of the lubricant gun illustrated herein and the following description will proceed with this understanding.

As disclosed in such co-pending application, a helical spring 37 is provided to tend to press the piston rod 19 toward the posterior end of the tube to tend to retract it to the position illustrated in Fig. 2 from a more advanced position which is illustrated in Fig. 1, when manual pressure exerted by its handle on the posterior end of the rod 19 is relieved.

The knob 28 is loosely fitted within the shell recess, there being lateral clearance between lateral walls and the lateral surfaces of the knob. The end of the recess forming the inner wall of the piston head is formed with surfaces extending from the axis of the piston divergently rearwardly to join with the cylindrical surfaces of the lateral walls of the recess. The end of the knob 28 is preferably parti-spherically formed and upon a forward thrust effort of the knob 28 against the end wall of the knob 28 against the end wall of the recess, it will be guided to a central position by the forwardly converging end walls of the recess. The fit of the knob and connecting rod within the piston is sufficiently loose that the knob and supporting connecting rod may be deflected laterally somewhat, while the piston will be retained in axial relation to the cylinder in which it reciprocates.

The space 33 within the cylinder 25 disposed in advance of the piston head 26 forms a compression chamber for the cylinder and in which lubricant may be exposed to the pressure of the piston 26 when advanced by manual pressure exerted on the rear handle end of the rod 19. The nozzle holder 23 is provided with an enlarged bore having cylindrical lateral walls 34 intermediate which and the compression chamber 33 is provided a shoulder 35.

A tubular nozzle and valve element 24 is press-fitted tightly within the lateral walls 34 of the enlarged bore of the dispensing element 22, the bore of the nozzle and valve element including a longitudinally aligned valve chamber 36 and a nipple tip receiving chamber 38 communicating therewith.

An annular valve seat is formed at 39 by inturned portions of the tubular element 24 at its lubricant receiving end, a valve ball 40 being pressed against said seat by a coiled compression spring 41 interposed between said valve ball and an annular spring support 42 which is tightly pressed within the interior walls of the valve chamber 36 at the discharge end of said chamber. The nozzle element per se comprises a tubular extension 43 of the element 24 extending forwardly therefrom and is provided with a bore 38 of preferably somewhat larger diameter than the valve chamber bore 36 to provide the lubricant nipple tip receiving recess previously referred to. The nozzle 43 terminates in an inturned annular portion 44 having a longitudinally rounded surface extending from the extreme end 45 of the nozzle to the interior of the bored recess 38, to provide a nipple engaging lubricant sealing contact surface of annular form adapted to engage the outer preferably longitudinally rounded surface 46 of the nipple 47.

Fig. 3 illustrates the preferred form of the contact surface of the nipple. As illustrated therein in enlarged view the contact surface is longitudinally curved on radii such as are about centers B, the centers B being positioned in the plane of the base end C of the contact surface. The annular portion C of the contact surface represents the portion thereof which is of greatest diameter. The medial radii R, each disposed at approximately an angle of 25° to the plane of the portion of the surface A which is of largest diameter, indicated by the line D, are preferably of about the same length as the distance between the centers B—B, of longitudinal curvature of the contact surface.
In the present embodiment of my invention, I show a contact surface formed on centers disposed as above set forth for the reason that when the nozzle bead is engaged therewith, the angle of inclination of such surface establishes a substantially wedging contact and the resistance effected at a given longitudinal pressure of the nozzle upon the nipple surface is greatly intensified compared to a more abruptly rounded contact surface.
The nipple 47 in one of its forms described in my said co-pending applications comprises a tubular element having an exteriorly threaded stem 48, a preferably hexagonal base 49 and a lubricant receiving tip 50 provided with a spring pressed valve 51 disposed at its inlet end and an annular bead having a longitudinally preferably conversely rounded outer surface 46 adapted for engagement by the contact surface previously described, as provided for the nozzle end 44. The nipple of the present application differs from that of my said co-pending applications in that the contact surface 46 thereof is longitudinally rounded on radii which are greater than the radii of curvature of the corresponding surface contact portions of the nipple of said co-pending applications. Also, the centers of the curvature therefore are preferably disposed more nearly in the plane of the intermediate longitudinal portion of the bead, so that the engagement between the nozzle and nipple contact surfaces will partake more of the nature of a wedging engagement and the engaged portions of the contact surface of the nozzle will be disposed inwardly toward the interior of the nipple tip receiving recess than in the embodiments of my invention disclosed in the said co-pending applications.

The object of this arrangement is to intensify the lateral component of resistance of fluid pressure tending to effect leakage of lubricant between the engaged nozzle and nipple contact surfaces when the piston 26 is thrust forwardly to express lubricant from the compression chamber 33 past the valve balls 40 and 51 of the nozzle element and nipple respectively and which lubricant under pressure otherwise strongly tends to pass between the engaged contact surfaces.

The inturned bead 44 of the nozzle is preferably formed by a press operation forcing the outer end portion of the nozzle inwardly under conditions which will effect a predetermined minimum diametrical dimension of the inner surfaces thereof.

The operation of the apparatus of my invention will now be readily understood, it being understood that the lubricant reservoir formed by the cup 2 is filled with lubricant such as grease or the like and the space in the tube 1 intermediate its walls and the piston rod 19 and tubular piston guide 27 is likewise filled with lubricant extending into the apertures 29 through said guide and also the compression chamber 33 will be filled with lubricant, the filling thereof being readily effected upon a few preliminary longitudinally reciprocable movements of the piston 26 effected by means of the handle, understood to be affixed on the posterior end of the rod 19 or otherwise.

Thereafter when the nozzle 43 is telescoped over a nipple tip 50 to bring the contact surfaces of the inwardly extending bead 44 of the nozzle into wedging contact pressure with the contact surface 46 of the outwardly extending bead 55 of the nipple at the base of its tip, by virtue of the pressure exerted upon the gun toward the nipple and by the nature of the wedging contact effected between the nozzle and nipple contact surfaces a good lubricant seal will be effected against the escape of lubricant from within the nozzle recess 38 past the engaged surfaces; the piston will be guided in a true axial direction relative to the axis of symmetry of the cylinder 25 even though due to looseness of fit between the parts and the direction of thrust by the operator on the handle of the rod 19. The forward movement of the piston 26, as in my co-pending applications, will effect an ejection of lubricant through the nozzle into the nipple and a subsequent retractive movement of the piston either by hand or by virtue of the action of the spring 37, will effect seating of the valve ball 40 and so reduce the pressure in the compression chamber 33 below atmospheric pressure, that when the valve ports 29 formed by the openings through the tubular piston guide 27 are uncovered by the retracted piston the pressure of atmosphere exerted on the outer surface of the follower 9 will press the follower toward the tube 1 and effect movement of lubricant from the reservoir into the tube 1 and through said ports to the compression chamber 33 to condition the apparatus for a subsequent operation.

By the provision of the inturned bead 44 at the end of the nozzle representing an improvement over the nozzle construction shown in my said prior co-pending applications, and as will be seen by reference to Fig. 2 hereof, a greater degree of relative angular disposition of the nozzle 43 and the nipple 47 may be had before further angularity is arrested by engagement as at 58 between a lateral wall of the nozzle recess 38 with the nipple tip near its end and before engagement is had by the nozzle with the nipple as at 59 wherein contact is had with the surface of the shelf afforded by the enlarged nipple base 49.

In this way for most purposes, a good lubricant seal may be had over a range of relative angular dispositions of nozzle and nipple amounting to at least 10° of relative angularity and without the necessity of providing a relatively oscillatable nozzle piece for the lubricant gun or other lubricant dispensing mechanism as is disclosed in my said co-pending applications.

Having thus described my invention, I am aware that numerous and extensive departures may be made from the embodiment herein illustrated and described, but without departing from the spirit thereof.

I claim:

1. A lubricating nipple, a lubricant receiving tip therefor provided with an exterior bead surrounding its base, having exterior surfaces longitudinally rounded about centers disposed in a circle interiorly of the bead, such circle disposed closely adjacent to a plane passing transversely through the bead medially thereof, and being of a diameter which approximates the length of the radii of longitudinal curvature of the exterior surface of said bead.

2. A lubricant coupler comprising a tubular nozzle and a tubular nipple, said nipple comprising a lubricant receiving tip having a divergent outer surface portion substantially spaced from its lubricant receiving end and a non-flaring portion terminating at said lubricant receiving end, said nozzle having an inwardly extending annular bead, of an inside diameter greater than the non-flaring portion of said tip adapted for pressure engagement with said nipple flaring portion.

3. A lubricant coupler comprising a tubular nozzle and a tubular nipple, a lubricant receiving tip for said nipple having a divergent outer surface portion substantially spaced from its lubricant receiving end, said nozzle having an inwardly extending annular bead adjacent its end of an inside diameter greater than the non-flaring portion of said tip adapted for pressure engagement with said nipple flaring portion, the interiorly disposed surfaces of the nozzle relative to the nozzle bead and adjacent thereto being of greater inside diameter than that of the bead.

4. In combination, a tubular nozzle piece having an inwardly turned annular nipple engageable flange, and a nipple provided with an annular pressure contact surface curved convexly longitudinally on radii of lengths less than half the maximum diameter of the annular surface.

OSCAR U. ZERK.